2,920,111
PRODUCTION OF FLUOROIODOHYDRO-CARBONS

Milton Braid, Philadelphia, and Murray Hauptschein, Glenside, Pa., assignors to Pennsalt Chemicals Corporation, Philadelphia, Pa., a corporation of Pennsylvania No Drawing. Application July 15, 1957
Serial No. 671,716

8 Claims. (Cl. 260—653)

This invention relates to fluorine compounds, and more particularly provides a novel method for making fluoro compounds including a novel fluoro olefin.

It is an object of this invention to provide a novel method for making, from a fluoro olefin, other fluoro compounds including a novel fluoro olefin.

It is a particular object of this invention to provide a novel method for making useful fluorinated compounds from vinylidene fluoride.

Another object is to provide a novel process for the preparation of $CF_3CH_2I$.

An additional object is to provide a novel fluoro olefin having the formula $CFI=CH_2$ and a process of preparing the same.

These and other objects will be apparent from a consideration of the following specification and claims.

This invention relates to the unexpected discovery of a novel method by which a fluorinated olefin is reacted with iodine to convert the olefin into a mixture of an iodinated alkane containing more fluorine atoms than the original fluorinated olefin, and an iodinated olefin containing less fluorine atoms than said original fluorinated olefin, each of said products containing the same number of carbon atoms as the original fluorinated olefin. In accordance with this invention, it has been found that on heating a fluorinated olefin with iodine at above about 100° C., a transfer of fluorine atoms occurs. This reaction is represented schematically by the equation

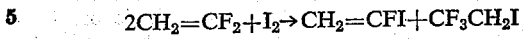

where R is H or an alkyl radical of from 1 to 6 carbon atoms.

As is evident from the above equation, the products of the reaction are the result of a disproportionation in which a fluorine atom is transferred from one organic molecule to another. This is a surprising and unusual reaction, in which an organic fluoride acts as a fluorinating agent in a manner not previously encountered.

The fluorinated olefins susceptible to the method of this invention are fluorinated olefins of the formula

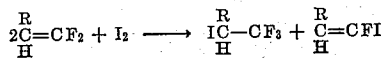

where R is as defined hereinabove. Such olefins comprise 1,1-difluoro-1-alkenes as exemplified by 1,1-difluoroethylene (vinylidene fluoride), 1,1-difluoro-1-propylene, 1,1-difluoro-1-butene, 1,1-difluoro-1-pentene, 1,1-difluoro-3-methyl-1-butene, 1,1-difluoro-3-methyl-1-hexene, 1,1-difluoro-1-octene, 1,1-difluoro-4,4-dimethyl-1-pentene and the like.

Of particular interest as a starting material for the present novel method for the conversion of fluorinated olefins to iodinated fluorolefins and fluoroalkanes is 1,1-difluoroethylene, which is cheap and readily available.

The two main products of the present reaction are a 1-fluoro-1-iodo-1-alkene and a 1,1,1-trifluoro-2-iodoalkane each of said products containing the same number of carbon atoms as the original olefin. With specific reference to the thermal reaction of 1,1-difluoroethylene with iodine, the reaction proceeds as represented by the following equation:

$=CF_2+I_2 \rightarrow CH_2=CFI+CF_3CH_2I$

The presently provided products comprising iodofluoroalkenes and iodotrifluoroalkanes are useful for a variety of agricultural and industrial purposes. The iodofluoroalkanes are effective fire-extinguishing agents. The iodofluoroalkane of formula $CF_3CH_2I$ derived from $CF_2=CH_2$ is a known compound which, in addition to possessing utility for the extinction of fires, may be used as an inhalant anesthetic and as an intermediate for the synthesis of $CF_3CH_2OH$ and of $CF_3CH_2OCH=CH_2$. The iodofluoro saturated and olefinic products of this invention, in addition to the uses mentioned above, may also be employed as refrigerants, dielectrics, lubricants, hydraulic mechanism fluids, heat transfer media, turbine impellants, and transformer fluids.

The presently provided olefinic product of the reaction of vinylidene fluoride with iodine, of the formula $CFI=CH_2$, is a novel compound, the preparation of which has not previously been reported. This 1-iodo-1-fluoroethylene is a mobile, low-boiling, liquid material, which is of particular utility for the preparation of flame-resistant polymers. For polymerization of $CFI=CH_2$, the olefinic material is contacted with a free radical catalyst such as a peroxide or azo polymerization catalyst, suitably in an amount of from 0.001 to 0.5% by weight, with reference to the olefin. Exemplary of suitable peroxide type free radical catalysts are benzoyl peroxide, di-tert-butyl peroxide and cumene hydroperoxide. Illustrative of azo type polymerization catalysts are $\alpha,\alpha'$-azodiisobutyronitrile, and azobis-(diphenylmethane). The monomer in contact with the polymerization catalyst is then heated to a temperature at which free radicals are evolved. The polymerization may be conducted at pressures ranging from ambient atmospheric pressure to 50,000 p.s.i.g.; preferably it is carried out in the pressure range from 100 to 20,000 p.s.i.g. A polymer is obtained which is characterized by very valuable attributes, such as flame resistance and flexibility.

1-fluoro-1-iodoethylene, $CFI=CH_2$, may also be employed as a solvent and propellant extender in aerosol compositions serving as vehicles for the application of biological toxicants and the like; and may additionally be employed as a chemical intermediate and solvent.

In carrying out the present process, wide latitude is permissible with respect to the proportions of the reactants. The reaction requires 1 mole of iodine and 2 moles of the fluoro olefin to form 1 mole of the iodo fluoro olefin and 1 mole of the iodo fluoro alkane, and in general, as a matter of efficiency and economy, this process may advantageously be performed employing the reactants in substantially that ratio. However, good yields of the above-identified products are found to be obtained when the molecular proportion of iodine to fluorinated olefin is as low as 1:5, and if desired, it may range down to as low as about 1:10. Alternatively, it may be desirable to employ iodine in excess, in which case a molecular ratio thereof to the fluoro olefin ranging up to 30:1 may be used when any advantage is to be gained thereby. If desired, part or all of the iodine may be obtained from a compound serving as a source of iodine. Illustrative of iodine-containing compounds from which iodine may be supplied are N-iodosuccinimide and the like. Catalysts are generally unnecessary, but if desired, catalysts such as aluminum triiodide may be introduced into the reaction mixture. The presence of solvents and diluents is not required, although the use of inert solvents such as dichlorodifluoromethane, dichlorotetrafluoroethane, 1,1,2-trichlorotrifluoroethane and the like is not excluded.

Operation of the present reaction at atmospheric pressure can be effected, provided contact of the reactants is maintained by appropriate choice of apparatus and conditions. Generally it will be advisable to confine the reactants under autogenous pressure at the temperatures of the reaction, in an autoclave or other suitable pressure vessel. Pressures ranging from atmospheric pressure up to about 50,000 pounds per square inch may be employed; the range of from atmospheric pressure to about 10,000 pounds per square inch is preferred.

The reaction can be conducted within a broad range of temperatures, from about 100° to about 300° C. A temperature sufficiently high within the operative range should be used to give a reasonable reaction rate. Temperatures on the order of 150° C. to 250° C. are preferred for optimum results.

The time required for completion of the reaction may vary from a few seconds to several hours, depending on the reaction conditions. It will be appreciated that the reaction conditions may be varied considerably, depending on the apparatus employed, and the like. While the invention has been described herein with particular reference to a batch process, with appropriate choice of equipment it may be practiced as a continuous process. It is to be understood that the apparatus used should be constructed of materials resistant to the corrosive effects of iodine.

The invention is illustrated but not limited by the following examples.

*Example 1*

80 grams (1.25 moles) of vinylidene fluoride are condensed under vacuum into a 170 ml. Monel autoclave, at the temperature of liquid nitrogen, containing 63.5 g. (0.25 mole) of iodine. The autoclave is then closed, heated to 185° C. during which time the pressure therein rises to 3200 pounds per square inch, and shaken at this temperature for 160 hours, when the pressure drops to 1300 pounds per square inch. After being cooled to room temperature, the autoclave is vented at atmospheric pressure to a receiver cooled with liquid nitrogen. Unreacted $CH_2=CF_2$ and a small amount of polymeric product are removed, and there is separated a liquid boiling up to 55° C. Fractional distillation of a 25 g. portion of the liquid product yields 24 g. of product, comprising liquid boiling at 54° to 55° C. and a second fraction boiling at from 40° to 46° C. The former, higher-boiling liquid is $CF_3CH_2I$, b. 55°/756 mm., $n_D^{29}$ 1.3981; the infra-red spectrum of this product is identical with that of an authentic sample prepared by iodide displacement on 2,2,2-trifluoroethyl p-toluenesulphonate. The fraction boiling at 40–46° C. is found to contain $CFI=CH_2$, b. 40° C., characterized spectroscopically by peaks in the infra-red at 6.09, 6.14, ca. 8.3, 8.68, 8.95, 9.55, 9.60, 10.20, 11.03, 11.82 and 12.26μ.

*Example 2*

For the conversion of $CFI=CH_2$ to a polymer, the olefinic material is mixed with 0.05% by weight of α,α'-azodiisobutyronitrile and held at 55° C. and 15,000 pounds per square inch for about 20 hours. There is produced a polymeric material which can be pressed into a thin, flame-resisting film useful as a wrapping material and the like.

While the invention has been described with reference to various particular preferred embodiments thereof, it will be appreciated that modifications and variations can be made without departure from the scope of the present claims.

What is claimed is:

1. The method which comprises contacting a 1,1-difluoro-1-alkene of the formula

where R is selected from the group consisting of H and alkyl radicals of 1 to 6 carbon atoms, with iodine at a temperature of from about 100° to about 300° C. and isolating from the resulting reaction product a compound selected from the group consisting of a 1,1,1-trifluoro-2-iodoalkane and a 1-fluoro-1-iodo-1-alkene, said 1,1,1-trifluoro-2-iodoalkane and said 1-fluoro-1-iodo-1-alkene each containing the same number of carbon atoms as said 1,1-difluoro-1-alkene.

2. The method which comprises contacting a 1,1-difluoro-1-alkene of the formula

where R is selected from the group consisting of H and alkyl radicals of 1 to 6 carbon atoms, with iodine at a temperature of from about 100° to about 300° C. and thereby forming a compound selected from the group consisting of a 1,1,1-trifluoro-2-iodoalkane and a 1-fluoro-1-iodo-1-alkene, said 1,1,1-trifluoro-2-iodoalkane and said 1-fluoro-1-iodo-1-alkene each containing the same number of carbon atoms as said 1,1-difluoro-1-alkene.

3. The method of claim 2, wherein said reaction is conducted at superatmospheric pressure, up to 10,000 p.s.i.

4. The method which comprises contacting 1,1-difluoroethylene with iodine at a temperature of from about 100° to about 300° C. and isolating from the resulting reaction product a fluorinated compound selected from the class consisting of $CF_3CH_2I$ and $CFI=CH_2$.

5. The method which comprises contacting $CF_2=CH_2$ with iodine at a temperature of from about 100° to about 300° C. and thereby forming fluorinated compounds selected from the class consisting of $CF_3CH_2I$ and $CFI=CH_2$.

6. The method which comprises contacting $CF_2=CH_2$ with iodine at a temperature above about 100° C. and thereby forming compounds selected from the class consisting of $CF_3CH_2I$ and $CFI=CH_2$.

7. The method which comprises contacting $CF_2=CH_2$ with iodine at a temperature of from about 160° to about 200° C. under a pressure up to about 10,000 pounds per square inch and isolating from the resulting reaction mixture a product comprising $CF_3CH_2I$.

8. The method which comprises contacting $CF_2=CH_2$ with iodine at a temperature of from about 160° to about 200° C. under a pressure up to about 10,000 pounds per square inch and isolating from the resulting reaction mixture a product comprising $CFI=CH_2$.

References Cited in the file of this patent

UNITED STATES PATENTS 2,424,667   Raasch _____ July 29, 1947

OTHER REFERENCES

Adams et al.: Organic Reactions, vol. 2, John Wiley & Sons, Inc., New York (1944), page 81.

Park et al.: Jour. Am. Chem. Soc., vol. 78, page 59, Jan. 5, 1956.